(12) United States Patent
Kyosti et al.

(10) Patent No.: US 9,786,999 B2
(45) Date of Patent: Oct. 10, 2017

(54) OVER-THE-AIR TEST

(75) Inventors: Pekka Kyosti, Jokirinne (FI); Jukka-Pekka Nuutinen, Martinniemi (FI)

(73) Assignee: Keysight Technologies Singapore (Holdings) Pte. Ltd., Singapore (SG)

( * ) Notice: Subject to any disclaimer, the term of this patent is extended or adjusted under 35 U.S.C. 154(b) by 53 days.

(21) Appl. No.: 13/121,691

(22) PCT Filed: Feb. 25, 2009

(86) PCT No.: PCT/FI2009/050155
§ 371 (c)(1),
(2), (4) Date: Apr. 22, 2011

(87) PCT Pub. No.: WO2010/040889
PCT Pub. Date: Apr. 15, 2010

(65) Prior Publication Data
US 2011/0189962 A1    Aug. 4, 2011

(30) Foreign Application Priority Data

Oct. 6, 2008    (WO) .................... PCTFI2008050554

(51) Int. Cl.
*H04B 17/00*    (2015.01)
*H01Q 25/00*    (2006.01)
(Continued)

(52) U.S. Cl.
CPC ............ *H01Q 25/00* (2013.01); *H01Q 21/20* (2013.01); *H04B 17/3912* (2015.01)

(58) Field of Classification Search
CPC ............................ H04W 24/02; H04W 24/06
(Continued)

(56) References Cited

U.S. PATENT DOCUMENTS

| 6,208,841 B1 | 3/2001 | Wallace et al. |
| 7,031,719 B2 | 4/2006 | Miyano et al. |

(Continued)

FOREIGN PATENT DOCUMENTS

| EP | 1482468 | 12/2004 |
| JP | H11-340930 A | 12/1999 |

(Continued)

OTHER PUBLICATIONS

Kildal, P.-S. et.al. "Correlation and capacity of MIMO systems and mutual coupling, radiation efficiency, and diversity gain of their antennas: coupling, radiation efficiency, and diversity gain of their antennas: simulations and measurements in a reverberation chamber", IEEE Communications Magazine, vol. 42, No. 12, p. 104-122 (Dec. 2004).

(Continued)

*Primary Examiner* — Ping Hsieh

(57) ABSTRACT

A testing system optimizes a cost function of a theoretical spatial cross correlation and a spatial correlation obtained with antenna elements for determining weights of the antenna elements, and forms a beam of a signal of at least one path of a simulated radio channel with at least two antenna elements of a plurality of antenna elements coupled to an emulator in an anechoic chamber. The at least two antenna elements are capable of polarizing the beam in a known manner.

4 Claims, 12 Drawing Sheets

(51) Int. Cl.
*H01Q 21/20* (2006.01)
*H04B 17/391* (2015.01)

(58) Field of Classification Search
USPC .... 455/67.11, 67.12, 425, 226.1, 304, 115.2, 455/146, 225, 303, 500, 501, 502, 503, 455/504, 505, 506
See application file for complete search history.

(56) References Cited

U.S. PATENT DOCUMENTS

| | | | |
|---|---|---|---|
| 7,123,943 | B2 | 10/2006 | Ylitalo |
| 7,430,413 | B2 | 9/2008 | Fleury et al. |
| 7,432,856 | B1 | 10/2008 | Hornbostel et al. |
| 2001/0031647 | A1* | 10/2001 | Scherzer et al. ............. 455/562 |
| 2002/0068613 | A1 | 6/2002 | Miyano et al. |
| 2003/0003883 | A1 | 1/2003 | Wallace et al. |
| 2005/0085223 | A1 | 4/2005 | Liu |
| 2005/0267715 | A1* | 12/2005 | Kolu et al. ................... 702/189 |
| 2006/0148429 | A1 | 7/2006 | Inogai et al. |
| 2006/0176993 | A1 | 8/2006 | Kwun et al. |
| 2007/0127559 | A1 | 6/2007 | Chang |
| 2007/0243826 | A1 | 10/2007 | Liu |
| 2008/0056340 | A1* | 3/2008 | Foegelle ...................... 375/224 |
| 2008/0123756 | A1 | 5/2008 | Daniels et al. |
| 2011/0084887 | A1 | 4/2011 | Mow et al. |
| 2011/0191090 | A1 | 8/2011 | Kyosti et al. |
| 2011/0270567 | A1 | 11/2011 | Mow et al. |
| 2011/0299570 | A1 | 12/2011 | Reed |
| 2012/0134400 | A1 | 5/2012 | Ding et al. |
| 2013/0006601 | A1 | 1/2013 | Mlinarsky et al. |
| 2014/0241408 | A1 | 8/2014 | Sozanski et al. |

FOREIGN PATENT DOCUMENTS

| | | | |
|---|---|---|---|
| JP | 2000-209166 | A | 7/2000 |
| JP | 2001004499 | A | 1/2001 |
| JP | 2002021511 | | 1/2002 |
| JP | 2005-520400 | | 7/2005 |
| JP | 2008-518567 | A | 5/2008 |
| JP | 11-340930 | A | 12/2011 |
| KR | 100796625 | B1 | 1/2008 |
| TW | 200740143 | | 10/2007 |
| TW | 200838180 | | 9/2008 |
| TW | 453675 | B | 4/2010 |
| WO | WO03077491 | A1 | 9/2003 |

OTHER PUBLICATIONS

Valenzuela-Valdes, J. F. et.al. "Emulation of MIMO Nonisotropic Fading Environments with Reverberation Chambers", IEEE Antennas and Wireless Propagation Letters, vol. 7, p. 325-328 (Jul. 2008).
Zhao, B.-J. et.al. "A New Spatial-Temporal Correlation Model for MIMO Channel", Proceedings of the Fifth International Conference on Machine Learning and Cybernetics, Dalian, p. 534-538 (Aug. 2006).
Li, Y. et.al. "Cluster-Based Double Bounce MIMO Channel Model and Capacity Analysis", International Conference on Wireless Communications, Networking and Mobile Computing WiCom, Piscataway, NJ, USA, p. 153-156 (Sep. 2007).
Rad, H. S. et.al. "The Impact of Non-Isotropic Scattering and Directional Antennas on MIMO Multicarrier Mobile Communication Channels", IEEE Transactions on Communications, vol. 56, No. 4, p. 642-652 (Apr. 2008).
Forenza, A. et.al. "Simplified Spatial Correlation Models for Clustered MIMO Channels With Different Array Configurations", IEEE Transactions on Vehicular Technology, vol. 56, No. 4, p. 1924-1934 (Jul. 2007).
Jari Partanen, International Search Report for corresponding PCT application PCTFI2009050155, pp. 1-5 (May 2009).
Christoph von Gagern, "New Wireless Technologies and OTA Measurements", COST2100 4th MCM, vol. 4th MCM TD 441, pp. 1-4 (Feb. 2008).

Michael Foegelle, "Over-the-Air Performance Testing of Wireless Devices with Multiple Antennas", URL:http://mobiledevdesign.com/hardware_news/radio_overtheair_performance_testing/, pp. 44-52 (Feb. 2006).
Lenora Reville, Supplementary European Search Report for corresponding European Application No. EP 09 81 8841, Aug. 31, 2012.
English translation of Official Action issued in corresponding Japanese Application No. 2011-529589, Aug. 1, 2012.
Noriyuki Ishii, Official Action for corresponding Japanese Application No. 2011-529588, pp. 1-3 (Nov. 14, 2012).
Official Action for corresponding Taiwan Application No. 098130533, pp. 1-4 (Nov. 20, 2012).
Japanese Office Action, Application No. 2011-529588, dated Jul. 29, 2013, 2 pages.
Canadian Office Action, Application No. 2,739,042; dated Aug. 1, 2014; 3 pages.
English Abstract of JP2002021511, Jan. 23, 2002.
Machine translation of JP2002021511, Jan. 23, 2002.
English abstract of JP11340930A, Dec. 10, 1999.
Machine translation of JP11340930A, Dec. 10, 1999.
Office Action mailed Sep. 8, 2015 in co-pending U.S. Appl. No. 13/121,208.
Graham Celine "Effectively testing MIMO-enabled wireless devices", Test & Measurement, 3 pages (Aug. 2007).
Turin et al. "A statistical model of urban multipath propagation", IEEE Transactions on Vehicular Technology, vol. 21, No. 1, pp. 1-9 (Feb. 1972).
Lin Guo et al. "Over The Air MIMO Channel Model Validation", 7th European Conference on Antennas and Propagation (EUCAP 2013), pp. 1848-1852.
Kyosti et al. "MIMO OTA test concept with experimental and simulated verification", 2010 Proceedings of the Fourth European Conference on Antennas and Propagation (EuCAP), pp. 1-5 (Apr. 2010).
Kyosti et al. "Channel Modeling for Radiated Testing of MIMO Capable Terminals", ICT-MobileSummit 2009 Conference Proceedings, Paul Cunningham and Miriam Cunningham (Eds), IIMC International Information Management Corporation, 2009, 9 pages.
Suvikunnas et al. "Evaluation of the Performance of Multiantenna Terminals Using a New Approach", IEEE Transactions on Instrumentation and Measurement, vol. 55, No. 5, pp. 1804-1813 (Oct. 2006).
Machine translation of KR100796625.
Ville Motonen, International Search Report (corresponding PCT Application No. PCT/FI2008/050554) Jun. 12, 2009.
Extended European Search Report received for European Patent Application No. 08805476.2, mailed on Oct. 7, 2013.
International Preliminary Report on Patentability for PCT Application PCT/FI2009/050155.
Written Opinion for PCT Application PCT/FI2009/050155.
Machine translation of TW200740143, Oct. 16, 2007.
Machine translation of TW200838180, Sep. 16, 2008.
Extended European Search Report dated Sep. 6, 2012 in Application No. EP09818841.0.
English-language translation of Office Action dated May 24, 2013 for Korean Application No. 2011-7010323.
English-language translation of Office Action dated Apr. 1, 2013 for Korean Application No. 2011-7010329.
English-language machine translation of Office Action dated Jan. 8, 2012 for Japanese Application No. 2011-529589.
English abstract of JP2005-520400, published Jul. 7, 2005.
Office Action mailed Mar. 10, 2016 in co-pending U.S. Appl. No. 13/121,208.
Office Action dated Oct. 11, 2012 in Korean Application No. 10-2011-7010329 (Unofficial/non-certified translation provided by foreign agent included).
Office Action dated Oct. 19, 2016 in co-pending U.S. Appl. No. 13/121,208.
English translation of Office Action dated Oct. 11, 2012 in Korean Application No. 2011-7010323.
Office Action dated Mar. 2, 2017 in European Patent Application No. 08805476.2, 5 pages.

(56) References Cited

OTHER PUBLICATIONS

Office Action dated May 28, 2014 in co-pending U.S. Appl. No. 13/121,208, 12 pages.
Office Action dated Sep. 20, 2013 in co-pending U.S. Appl. No. 13/121,208, 12 pages.
Office Action dated Nov. 19, 2014 in co-pending U.S. Appl. No. 13/121,208, 21 pages.
Office Action dated Mar. 26, 2013 in co-pending U.S. Appl. No. 13/121,208, 29 pages.
International Preliminary Report on Patentability dated Jan. 28, 2011 for PCT/FI2008/050554, 6 pages.
Examiner's Answer dated Jul. 7, 2017 in co-pending U.S. Appl. No. 13/121,208, 12 pages.

* cited by examiner

OVER-THE-AIR TEST

CROSS-REFERENCE TO RELATED APPLICATIONS

This application is a National Phase application of International Application No. PCT/FI2008/050155 filed Feb. 25, 2009, which claims priority to PCT/FI2008/050554, filed Oct. 6, 2008, which are incorporated herein by reference in their entirety.

BACKGROUND

Field

The invention relates to an over-the-air testing of a device in an anechoic chamber.

Description of the Related Art

When a radio frequency signal is transmitted from a transmitter to a receiver, the signal propagates in a radio channel along one or more paths having different angles of arrivals, signal delays and powers, which causes fadings of different durations and strengths in the received signal. In addition, noise and interference caused by other transmitters interfere with the radio connection.

A transmitter and a receiver can be tested using a radio channel emulator emulating real circumstances. In a digital radio channel emulator, a channel is usually modeled with a FIR filter (Finite Impulse Response filter), which generates convolution between the channel model and an applied signal by weighting the signal, delayed by different delays, with channel coefficients, i.e. tap coefficients, and by summing the weighted signal components. The channel coefficients are functions of time to correspond to the temporal behavior of a real channel. A traditional radio channel emulator test is performed via a conducted connection such that a transmitter and a receiver are coupled together via a cable.

Communication between a subscriber terminal and a base station of a radio system can be tested using an OTA (Over The Air) test where a real subscriber terminal is surrounded by a plurality of antennas of an emulator in an anechoic chamber. The emulator which may be coupled to or act as a base station emulating paths between the subscriber terminal and the base station according to a channel model. In the test, the direction of a path depends on the direction of an antenna, and hence the directions of paths are limited and there is a need for a better OTA test solution.

SUMMARY

An object of the invention is to provide an improved solution. According to an aspect of the invention, there is provided a method of communicating with an electronic device under test through a simulated radio channel of an emulator. The method comprises optimizing a cost function of a theoretical spatial cross correlation and a spatial correlation obtained with antenna elements for determining weights of the antenna elements; and forming, on the basis of the weights, a beam of a signal of at least one path of a simulated radio channel with at least two antenna elements of a plurality of the antenna elements coupled to an emulator in an anechoic chamber.

According to another aspect of the invention, there is provided a method of communicating with an electronic device under test through a simulated radio channel of an emulator. The method comprises optimizing a cost function of a theoretical spatial cross correlation and a spatial correlation obtained with antenna elements for determining weights of the antenna elements; and forming, on the basis of the weights, a beam of a signal of at least one path of a simulated radio channel with at least two antenna elements of a plurality of the antenna elements coupled to an emulator in an anechoic chamber, the at least two antenna elements polarizing the beam in a known manner.

According to another aspect of the invention, there is provided a testing system of communicating with an electronic device under test through a simulated radio channel of an emulator. The testing system is configured to optimize a cost function of a theoretical spatial cross correlation and a spatial correlation obtained with antenna elements for determining weights of the antenna elements; and form, on the basis of the weights, a beam of a signal of at least one path of a simulated radio channel with at least two antenna elements of a plurality of the antenna elements coupled to an emulator in an anechoic chamber.

According to another aspect of the invention, there is provided a testing system of communicating with an electronic device under test through a simulated radio channel of an emulator. The testing system is configured to optimize a cost function of a theoretical spatial cross correlation and a spatial correlation obtained with antenna elements for determining weights of the antenna elements; and form, on the basis of the weights, a beam of a signal of at least one path of a simulated radio channel with at least two antenna elements of a plurality of the antenna elements coupled to an emulator in an anechoic chamber, the at least two antenna elements being configured to polarize the beam in a known manner.

The invention provides several advantages. Spatial correlation characteristics and/or polarization characteristics can be taken into account in the weights of antenna elements.

BRIEF DESCRIPTION OF THE DRAWINGS

In the following, the invention will be described in greater detail with reference to the embodiments and the accompanying drawings, in which.

DETAILED DESCRIPTION

Channel impulse responses and an optimization of the antenna weights in OTA may be formed so that an accurate correlation, an angle of arrival and polarization properties may be possible for a DUT.

Figure 1:
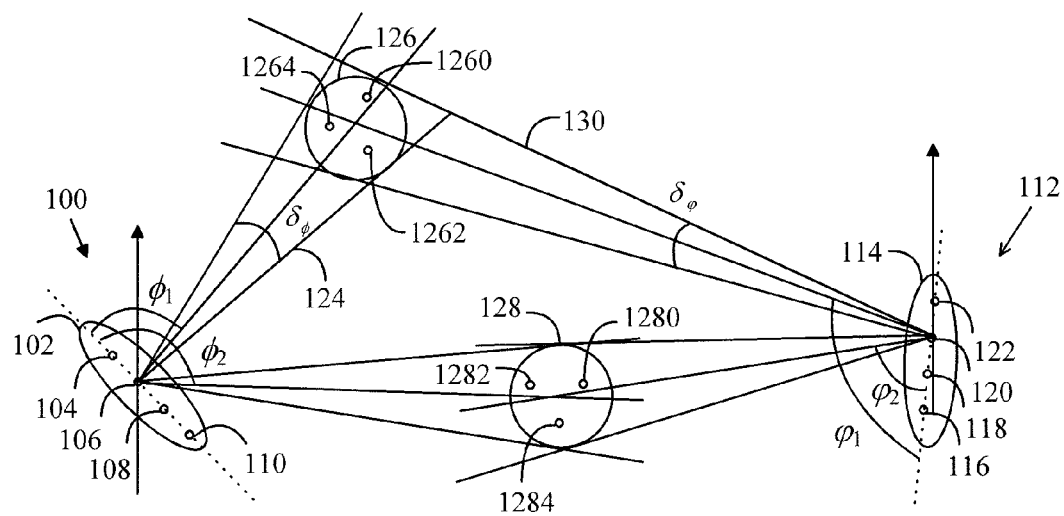
FIG. 1 illustrates a propagation of a radio signal.

FIG. 1 illustrates propagation of a radio signal between a transmitter and a receiver. The transmitter 100 may comprise an antenna 102 of at least one antenna element 104 to 110. The antenna may be, for example, ULA (Uniform Linear Array) antenna where the spacing between the antenna elements is constant, for example half a wavelength of the radio signal. In this example, the transmitter 100 may be a base station of a radio system. Correspondingly, the receiver 112 may comprise an antenna 114 of at least one antenna element 116 to 122. In this example, the receiver 112 may be a subscriber terminal of a radio system. When the transmitter 100 transmits a radio signal, a transmission beam 124 may be directed to an angle $\phi_1$ and its angle spread may be $\delta_\phi$ which may be $x\delta_\phi^{std}$, where x is a real number larger than zero and $\delta_\phi^{std}$ is a standard deviation of the angle $\phi_1$. The transmission beam 124 may hit at least one cluster 126, 128 which reflects and/or scatters the radiation. Each cluster 126, 128 may have a number of active regions 1260 to 1264, 1280 to 1284 which predominantly reflect and/or scatter in the cluster 126, 128. A cluster 126, 128 may be fixed or moving, and a cluster 126, 128 may be a natural or man-made object such as a building, a train, a mountain etc. The active regions may be some finer structural features on an object.

The reflected and/or scattered beam may be directed towards the antenna 114 of the receiver 112. The antenna 114 may have a reception angle $\phi_1$ and its angle spread may be S, which may be $y\delta_\phi^{std}$, where y is a real number larger than zero and $\delta_\phi^{std}$ is a standard deviation of the angle $\phi_1$. The beam 130 reflected and/or scattered from a cluster 126 may then be received. Similarly, the antenna 114 may also have a beam from a reception angle $\phi_2$ and its angle spread may be $\delta_{\phi 2}$. The propagation from a transmitter 100 to a receiver 112 via at least one cluster 126, 128 causes an additional delay to a signal with respect to a signal traveling straight along a line-of-sight.

Clusters 126, 128 in a radio channel are responsible for multi path propagation. It can be approximated that a path and a cluster 126, 128 have a correspondence such that one received path comes from one cluster. Hence, a radio channel may be described by cluster powers, delays, nominal AoA (Angle of Arrival) and AoD (Angle of Departure), and angle spreads of clusters at both arrival and departure ends. Additionally, information on the receiver and transmitter antenna arrays is required. The information may include values of parameters of an antenna array geometry and an antenna field pattern (beam). Also the subscriber terminal velocity vector and/or the cluster Doppler frequency component may be needed.

Table 1 presents an example of a clustered delay line model of a radio channel in an urban environment. Clusters 1 and 3 have three active regions which have different delays and powers.

TABLE 1

Non-line-of-sight clustered delay line model, urban macro-cell.

| Cluster # | Delay [ns] | | | Power [dB] | | | AoD [°] | AoA [°] |
|---|---|---|---|---|---|---|---|---|
| 1 | 0 | 5 | 10 | -3.5 | -5.7 | -7.5 | 6 | 29 |
| 2 | 5 | | | -9.2 | | | 44 | -98 |
| 3 | 20 | 25 | 30 | -3.0 | -5.2 | -7.0 | 2 | 8 |
| 4 | 45 | | | -7.8 | | | -34 | -114 |
| 5 | 265 | | | -3.7 | | | 26 | 70 |
| 6 | 290 | | | -8.6 | | | -41 | 107 |
| 7 | 325 | | | -2.5 | | | -17 | 59 |
| 8 | 340 | | | -7.3 | | | -33 | -103 |
| 9 | 355 | | | -3.8 | | | 24 | 73 |
| 10 | 440 | | | -6.9 | | | -34 | -111 |
| 11 | 555 | | | -8.9 | | | -38 | -112 |
| 12 | 645 | | | -9.0 | | | 44 | 122 |
| 13 | 970 | | | -9.8 | | | 53 | 129 |
| 14 | 1015 | | | -15.0 | | | 54 | 153 |
| 15 | 1220 | | | -13.4 | | | 53 | -145 |
| 16 | 1395 | | | -14.9 | | | 52 | -157 |
| 17 | 1540 | | | -16.7 | | | 57 | -178 |
| 18 | 1750 | | | -11.2 | | | 53 | -114 |
| 19 | 1870 | | | -18.2 | | | -54 | -160 |
| 20 | 1885 | | | -17.8 | | | -60 | -175 |

An ASD (Angle Spread of Departure) may be assumed constant for all clusters, ASD=2° in this example. Correspondingly, an ASA (Angle Spread of Arrival) may be assumed constant for all clusters, ASA=15° in this example. Additionally, XPR (Cross Polarization Power ratio) may also be assumed constant for all clusters, XPR=7 dB in this example. They may also be different for different clusters.

An impulse response estimate $H_{u,s,n}(t, \tau)$ of a radio channel may be expressed in a mathematical form as follows:

$$H_{u,s,n}(t, \tau) = \sqrt{(P_n)} \sum_{m=1}^{M} \begin{pmatrix} F_{tx,s}(\phi_{n,m})\exp(jd_s k\sin(\phi_{n,m})). \\ F_{rx,u}(\phi_{n,m})\exp(jd_u k\sin(\phi_{n,m})). \\ \exp(j(\Phi_{n,m} + 2\pi v_{n,m}t)\delta(\tau - \tau_{n,m})) \end{pmatrix}, \quad (1)$$

where $F_{tx,s}$ is a transmission antenna field pattern (i.e. transmission beam), $F_{rx,u}$ is a reception antenna field pattern (i.e. reception beam), $d_s$ is a distance between the antenna elements in a ULA transmission antenna, $d_u$ is a distance between the antenna elements in a ULA reception antenna, k is a wave number ($k=2\pi/\lambda_0$, where $\lambda_0$ is a wavelength of the radio signal), $P_n$ means a cluster power, M means the number of active regions in a cluster, m is an index of an active region, n is an index of a cluster, $\Phi_{n,m}$ is a constant phase term of a scatterer n,m, $v_{n,m}$ is a Doppler frequency of an active region having index n,m and $\tau$ is a delay.

A Doppler frequency of an active region having index n,m can be expressed as:

$$v_{n,m} = \frac{\|\bar{v}\|\cos(\varphi_{n,m} - \theta_v)}{\lambda_0}, \quad (2)$$

where $\bar{v}$ is a velocity vector and $\|\bar{v}\|$ is a relative speed between an active region and the receiver.

The impulse response estimate in equation (1) may be simplified, when the receiver antenna is assumed omnidirectional, in the following form $$H_{s,n}(t,\tau) = \sqrt{(P_n)} \sum_{m=1}^{M} \begin{pmatrix} F_{tx,s}(\phi_{n,m})\exp(jd_s k\sin(\phi_{n,m})). \\ \exp(j(\Phi_{n,m} + 2\pi v_{n,m}t))\delta(\tau - \tau_{n,m}) \end{pmatrix}. \quad (3)$$

Channel models like SCM, SCME, WINNER and IMT-Advanced are geometrical models comprising bi-directional clusters. Power azimuth spectra on transmitter and receiver ends are like in the example of FIGS. 2 and 3. Although the generation of channel coefficients is performed by summing rays (discrete directions) in eq. (1), clusters may be defined by the parameters described above. In other words, specular scatterers are not essential part of the model, they are just tools to generate channel coefficients.

The fading, including Doppler and possible BS antenna correlation as well as channel power delay profile, is included in the channel coefficients.

Only the DUT antenna correlation and other DUT antenna effects are left out of the real radio transmission in the OTA chamber.

$$H_{s,n}(t,\tau) = \sqrt{P_n} \sum_{m=1}^{M} \begin{pmatrix} F_{tx,s}(\phi_{n,m})\exp(jd_s k\sin(\phi_{n,m})). \\ \exp(j(\Phi + 2\pi v_{n,m}t))\delta(\tau - \tau_{n,m}) \end{pmatrix} \quad (4)$$

Doppler frequencies $v_{n,m}$ may be determined on the basis of AoA angles. The result is a discrete impulse response with vector coefficients $H_n(t,t)$. Dimensions of $H_n(t,t)$ are $1 \times S$, where S is the number of BS antennas. This step can be done by a Matlab implementation of a geometric channel model, e.g. NEWCOM model.

Mapping of the clusters n may be performed to proper emulator channels and OTA antennas depending on the cluster nominal direction and the cluster angle spread.

An approximation of the cluster arrival angle spread by two OTA antennas may be a source of inaccuracy. Especially in the case of sparse OTA antenna layout and narrow clusters, i.e. $\Delta\theta \gg$ AoA angle spread. Cluster angle spread values at the DUT end are, for example, in SCM=35°, WINNER 3° to 22°, IMT-Advanced 3° to 22°, and TGn 14° to 55°, depending on modeled scenario.

It may be necessary to split a single cluster to at least two OTA antennas in order to generate decorrelation between possible DUT antennas. If the signal is transmitted only from a single OTA antenna, the case is equal to specular reflection with no angle spread and full correlation at the DUT.

Figure 2:
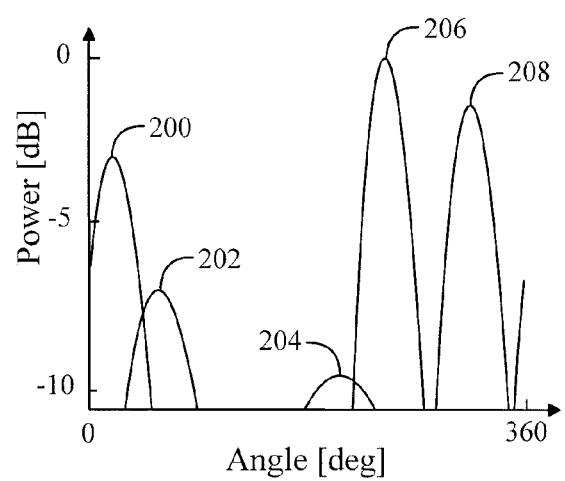
FIG. 2 illustrates a power azimuth spectrum of reception beams.

FIG. 2 illustrates a power azimuth spectrum of reception beams from five clusters. In FIG. 2 the x-axis is angle in degrees and the y-axis is power in decibels. The five beams 200, 202, 204, 206 and 208 are received at different angles of arrival. The beams 200, 202, 204, 206 and 208 may be received at different moments of time i.e. at least one of them may have a different delay with respect to the other beams.

Figure 3:
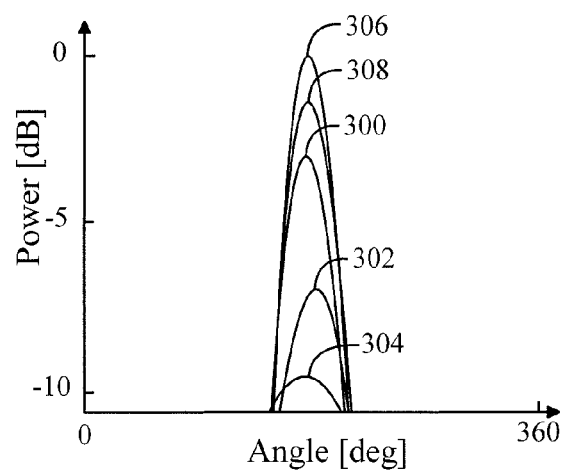
FIG. 3 illustrates a power azimuth spectrum of transmission beams.

FIG. 3 shows a power azimuth spectrum of transmission beams to the same five clusters according to the example in FIG. 2. In FIG. 3, the x-axis is angle in degrees and the y-axis is power in decibels. The five beams 300, 302, 304, 306 and 308 are transmitted at only a slightly different angles of departure since the reflecting and/or scattering clusters are only slightly dispersed in the angle.

Figure 4:
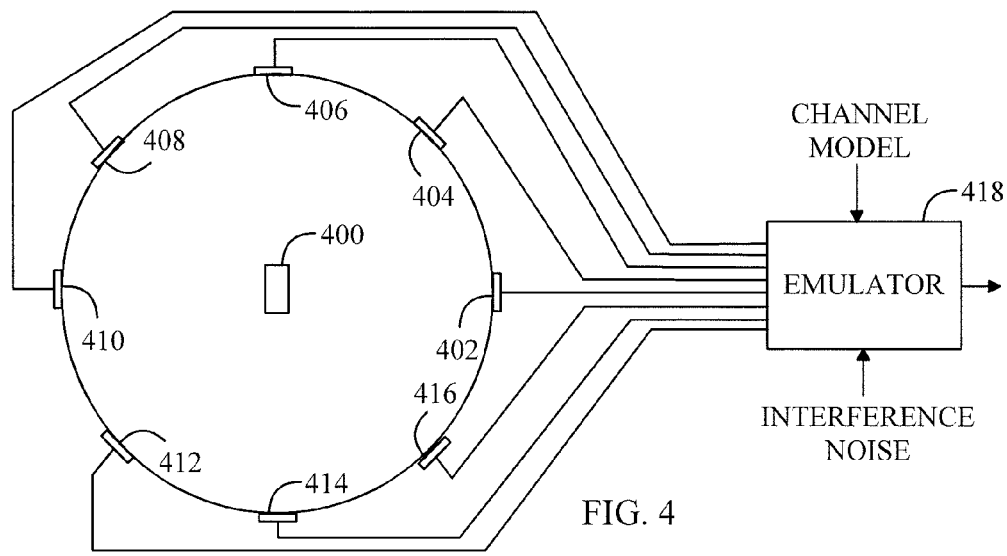
FIG. 4 shows a measurement configuration in an OTA test chamber.

FIG. 4 presents an OTA test chamber. A DUT 400 is in the centre and chamber antenna elements 402, 404, 406, 408, 410, 412, 414 and 416 are in a circle around the DUT 400 with uniform spacing (e.g. 45° with 8 elements). Let us denote directions of K OTA antennas with $\theta_k$, k=1, . . . , K and spacing of antenna in the angle domain with $\Delta\theta$. Each of the antennas is connected to a single emulator output port. If a single antenna element is considered, the emulator configuration is 1×8 SIMO, with two antenna elements 2×8 MIMO etc.

MS (DUT) antenna characteristics are assumed unknown. This information may not be used in the OTA modelling.

The test chamber may be an anechoic room. A DUT 400 such as a subscriber terminal may be surrounded by antenna elements 402, 404, 406, 408, 410, 412, 414 and 416 which are coupled to an emulator 418 which may be, for example, EB (Elektrobit) Propsim® C8. The emulator 418 may comprise a processor, a memory and a suitable computer program. In this example, there are eight antenna elements in a circle separated by a constant angle of 45°. In general, there may be at least two antenna elements 402 to 416 and they may be separated from each other by a separation angle $\Delta\theta$. When there are at least three antenna elements 402 to 416, the separation angle $\Delta\theta$ may be the same or different for any two successive antenna elements 402 to 416. The antenna elements 402 to 416 may be at the same or different distances from the DUT 400 and the antenna elements 402 to 416 may be placed only in a sector instead of a full angle or a full solid angle. The DUT 400 may also have one or more elements in the antenna.

Communicating with the DUT 400 over the air enables testing an antenna design, polarization and placement effects in such a way that path directions may be freely included in the testing. That is not possible if a cable connection is used between the emulator 418 and the DUT 400.

The emulator 418 has a channel model for the test. The channel model may be selected by a person accomplishing the test. Additionally, interference and noise may be input to the test in a desirable manner and to a desirable extent. The channel model used may be a play back model based on a recorded channel from a real radio system or it may be an artificially generated model or it may a combination of a play back model and an artificially generated model.

Assume now that the emulator 418 is coupled to or acts as a base station of a radio system and the antenna elements 402 to 416 are transmitting to the DUT 400 which acts as a receiving subscriber terminal of the radio system. It may be assumed that DUT antenna characteristics are unknown and that information may be ignored in the following example. The OTA antenna elements 402 to 416 may be assumed to be at angles $\theta_k$ of directions from the DUT, where k is 1, . . . , K, where K is the number of antenna elements. The angular spacing of the antenna elements 402 to 416 may be constant $\theta_{k+1} = -\theta_k = \Delta\theta$.

A geometric channel model in the emulator 418 may be mapped on the OTA antenna elements 402 to 416. The emulator 418 simulates the situation where the transmitted radiation from the base station hits clusters. The emulator 418 also forms a reflected and/or scattered beam from each cluster and divides the departure power and delay of the cluster suitably to the at least one antenna element 402 to 416. Hence, the antenna elements 402 to 416 are controlled to reproduce reflected and/or scattered beams of clusters.

Often an angle of a beam representing a reflected and/or scattered beam from a cluster differs from an angle $\theta_k$ of an antenna element 402 to 416 more than a threshold which may be, for example, 1°. Then such a beam may be transmitted using at least two antenna elements 402 to 416.

In an embodiment, the power of a simulated cluster may be divided between two antenna elements on the basis of antenna angles $\theta_k$ and a cluster angle $\phi_n$. An angle $\theta_k$ of an antenna element k closest to a cluster angle $\phi_n$ may be found according to the following mathematical equation $$\theta_k = \Delta\theta \text{int}\left(\frac{\min_j\left(\theta_j + \frac{1}{2}\Delta\theta - \varphi_n\right)}{\Delta\theta}\right), \quad (5)$$

where min means minimum value of the expression among all values of $\phi_j$, int means an integer value of the division (including 0). The value of k is $$\text{int}\left(\frac{\min_j\left(\theta_j + \frac{1}{2}\Delta\theta - \varphi_n\right)}{\Delta\theta}\right).$$

The second antenna element k+1 may then be the one having an angle $\theta_k + \Delta\theta = \theta_{k+1}$. Hence, the selected antenna elements may be those between which the beam reflected and/or scattered from a cluster at least mainly is with respect to the DUT 400.

A selection of the OTA antennas for a cluster n can be done by selecting the two closest values of $\theta_k$ to AoA nominal angle $\phi_n$. The power of cluster n is divided between the two OTA antennas depending on angular distance between $\theta_k$ and $\phi_n$. If e.g. $\phi_n$ is exactly halfway between $\theta_k$ and $\theta_{k+1}$ the power is divided 50% and 50% for each.

A weight $w_{n,k_i}$ for each antenna element 402 to 416 may be calculated in the following manner $$w_{n,k_i} = 1 - \frac{|\theta_{k+i} - \varphi_n|}{\Delta\theta}, \quad (6)$$

where i is either 1 or 2, k is index of an antenna element closest to an angle $\phi_n$ of a cluster n. The power $P_n$ of a cluster n to an antenna element k is multiplied by a weight $w_{n,k_i}$ such that $P_k + P_{k+1} = P_n$.

Figure 10:
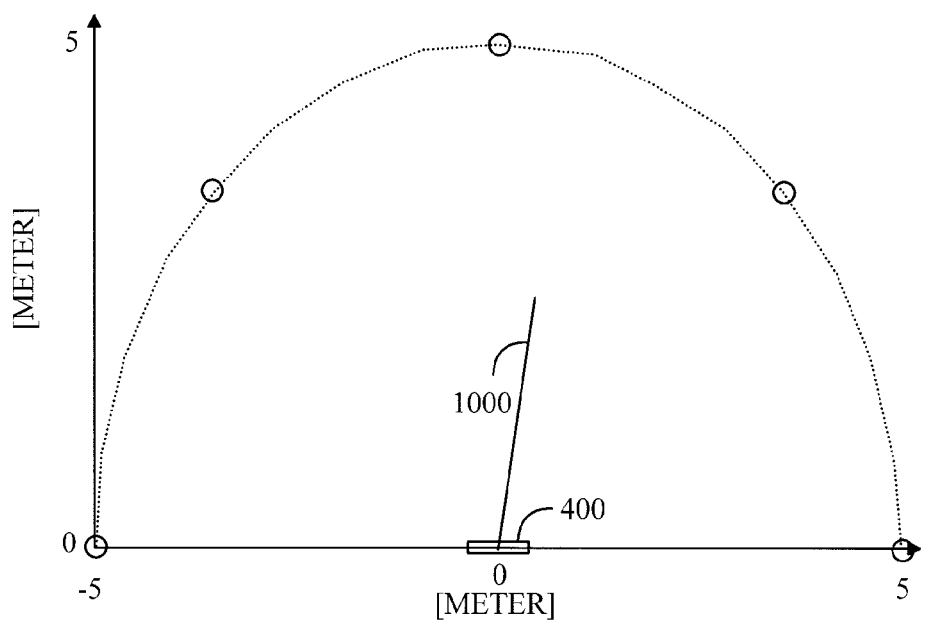
FIG. 10 presents an AoA in an OTA chamber.

FIG. 10 presents an AoA in an OTA chamber. A line 1000 is an AoA vector and circles are OTA antenna elements around the DUT 400.

Figure 11:
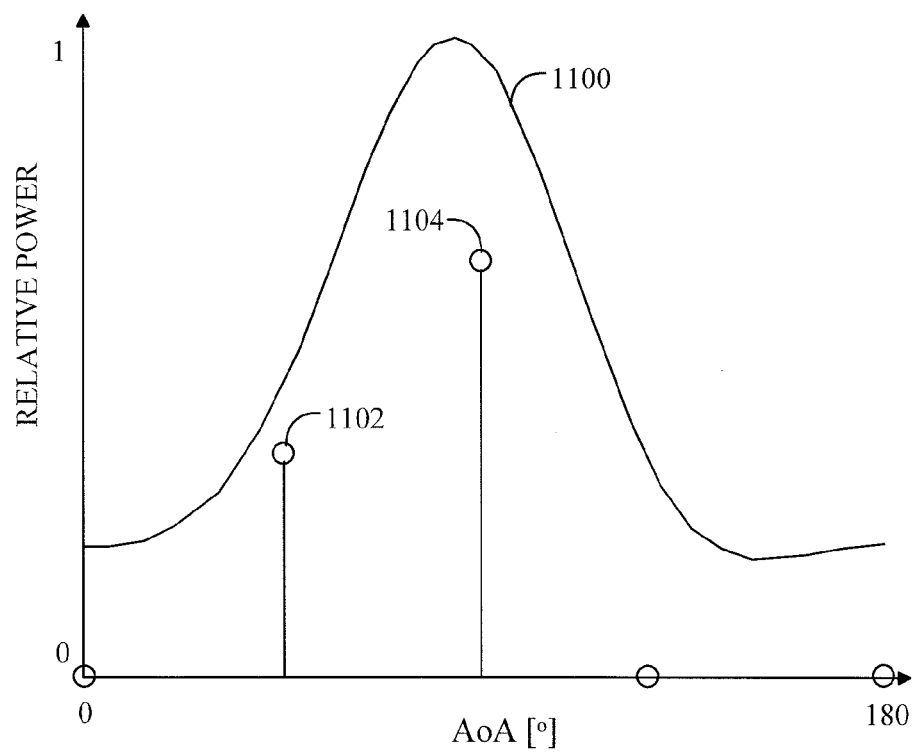
FIG. 11 presents antenna weighting of the antenna elements of FIG. 10.

FIG. 11 presents antenna weighting of the antenna elements of FIG. 10. A curve 1100 depicts a beam of the antenna elements seen by a receiver. Two weights 1102, 1104 of the antenna elements are non-zero while the rest are zero.

Assume now 8 antenna elements in a circle around a DUT, i.e. K=8 and $\Delta\theta=45°$, a single base station antenna, a single cluster, cluster power 2, AoA $\phi_n=37°$. A power $P_k$ for antenna element 402 (antenna k) becomes $$P_k = P_n w_{n1}$$
$$= P_n\left(1 - \frac{|0° - 37°|}{45°}\right)$$
$$= 2.0 \cdot 0.1778$$
$$= 0.3556$$

And a power $P_{k+1}$ for antenna element 404 (antenna k+1) becomes $$P_{k+1} = P_n w_{n2}$$
$$= P_n\left(1 - \frac{|45° - 37°|}{45°}\right)$$
$$= 2.0 \cdot 0.8222$$
$$= 1.6444$$

Figure 5:
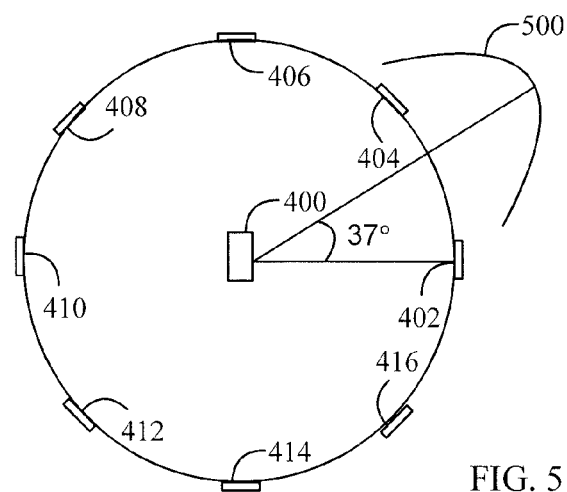
FIG. 5 shows a beam to be modeled by the antenna elements.

FIG. 5 illustrates the beam 500 formed by the antenna elements 402, 404 with the calculated power division. The signals fed to different antenna elements may also be phase shifted with respect to each other such that a directional power spectrum may be modified. The phase shifting may be performed by weighting the base band signals with suitable complex coefficients which set powers and relative delays of the signals. The phase shifting may also be performed by delaying the radio frequency signals with respect to each other. For example, desired delays may be selected suitably from a bank of digital delays (for example digital finite impulse response filter structure). Different beams of different paths of the simulated radio channel may be formed at different moments of time. A beam of a path of the simulated radio channel may be formed at different moments of time. A plurality of different beams of different paths of the simulated radio channel may be formed at a moment of time.

Figure 6:
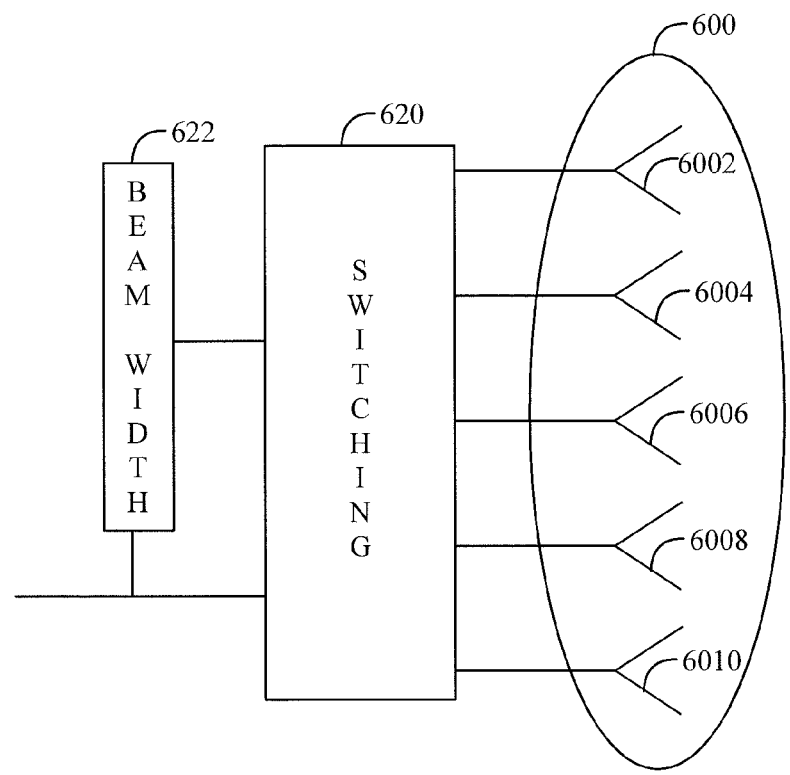
FIG. 6 shows a group of antenna elements and associated antenna group switching network.

FIG. 6 presents a group 600 of antenna elements. In an embodiment, the antenna may comprise at least one group 600 of antenna elements 6002, 6004, 6006, 6008, 6010. Hence, in place of the antenna element 402, for example, there may not only be one antenna element but several elements 6002, 6004, 6006, 6008, 6010. Each antenna element 402 to 416 may comprise, for example, five elements. In general, in place of an antenna element 402 to 416 there may be a group 600 of at least two antenna elements 6002, 6004, 6006, 6008, 6010.

A mapping to OTA antenna elements may be simpler and more accurate if a single OTA antenna element is replaced by a group 600 of antenna elements 6002, 6004, 6006, 6008, 6010. Assume that a group comprises G antenna elements 6002, 6004, 6006, 6008, 6010.

The number of elements 6002, 6004, 6006, 6008, 6010 to be fed in each antenna group 600 may be selected on the basis of a channel model arrival (per cluster) azimuth spread. Each group may be fed by a single emulator output port, and antenna elements 6002, 6004, 6006, 6008, 6010 of each group may be connected to the emulator with a switching network 620 which may comprise at least one splitter, combiner, attenuator and/or phase shifter. In an embodiment, the switching (i.e. selection of antenna elements) may be similar for all groups and it may to be done only once per measurement.

On the basis of the signal from the emulator a beam controller 622 may control how many antenna elements of a group are needed for a beam. In general, any positive integer number of antenna elements up to the maximum may be used.

In an embodiment, an odd number of elements may be used. For example, with G=5 choices may be one, three or five elements, depending on the scenario of the channel model. If there are narrow clusters in the channel model, three elements may be enough for the beam. If the clusters are wider, the maximum number of elements may be used for the beam.

The selection of antenna elements in a group may be expressed in a mathematical form as follows:

$$Z' = \min_Z \left( \text{round}\left(\frac{\delta_\varphi}{\Delta\theta/G}\right) \leq Z \right), \quad (7)$$

where $Z = G-2j$ and $j$ is $0, \ldots, (G-3)/2$, round means rounding to a closest integer value of the division (the minimum value is 1).

A mapping of the channel model to an OTA antenna may be performed by applying the following rules. Set each of the clusters to appropriate emulator channels and OTA antenna elements depending on a nominal direction of a cluster. Selection of the OTA antenna elements for a cluster n may be made by taking the closest OTA antenna group centre $\theta_k$ for a nominal AoA $\phi_n$ of a cluster. Select the number of antenna elements, for example Z', within a group by a switch 622.

Figure 7:
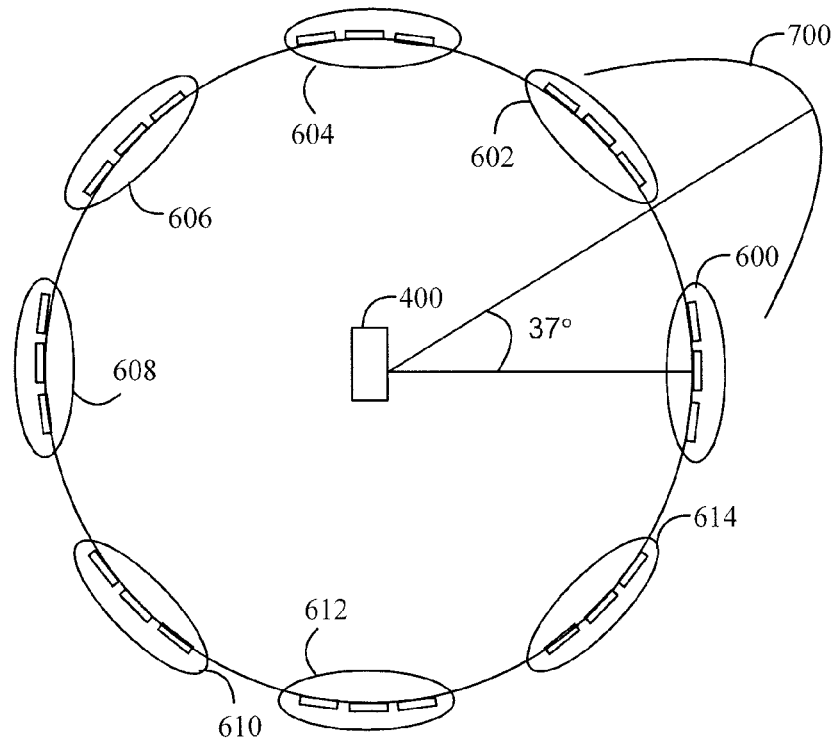
FIG. 7 shows a DUT surrounded by groups of antenna elements.

FIG. 7 presents a DUT 400 surrounded by groups 600 to 614 of antenna elements. In this example, each group 600 to 614 has three antenna elements. A beam 700 may be formed using a group 602. With eight groups and five elements in each group a full circle may be covered with uniformly located antenna elements. If a cluster is extremely wide requiring a very wide beam, for example wider than $\Delta\theta$, the cluster may be mapped to more than one antenna group.

Several groups may also be used to form a beam. The groups may be applied in the same manner as what is described relating to equations (4) and (5) for selecting two antenna elements. Then, instead of selecting two antenna elements, two groups of antenna elements may be selected for a beam. In FIG. 7, a beam 700 may be formed using groups 600 and 602.

In an embodiment, fixed weights may be implemented for antenna elements such that, for example, Gaussian or Laplacian shaped cluster power azimuth spectrum can be replicated.

A reception using at least two antenna elements is performed in a corresponding manner. Hence, the method may be applied in both uplink and downlink. Assume now that the antenna elements 402 to 416 are receiving signals from the DUT 400. Signals received by the at least two antenna elements 402 to 416 may be combined in the emulator 418 for forming a reception beam of a signal of a path of a simulated radio channel. The combining may comprise weighting the power from the two antenna elements or group of antenna elements using weights $w_{nk+1}$ calculated in equations (4) and (5). Additionally, the shape and direction of the beam may be weighted using complex coefficients or another sort of phase shifting.

Figure 8:
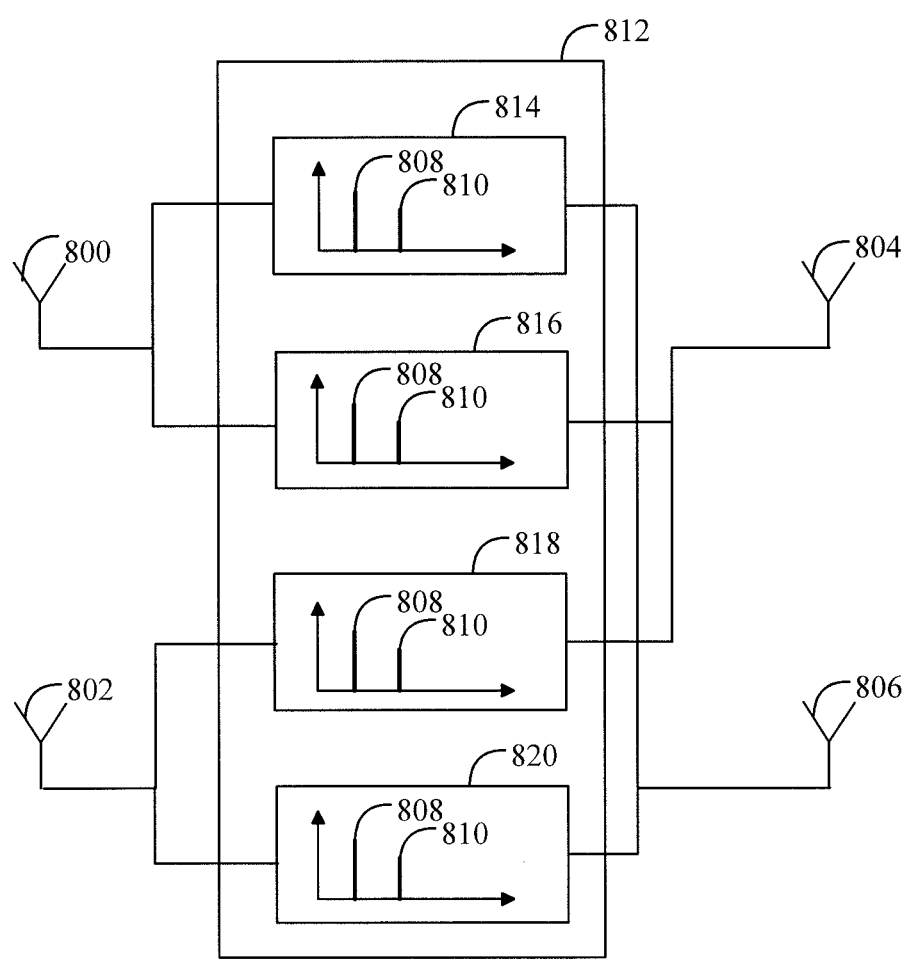
FIG. 8 presents controlling delays of antennas in a MIMO configuration.

The embodiments may be applied in 3GPP (Third Generation Partnership Project) LTE (Long Term Evolution), WiMAX (Worldwide Interoperability for Microwave Access), Wi-Fi and/or WCDMA (Wide-band Code Division Multiple Access). In the MIMO (Multiple In Multiple Out) which is also a possible application, signals are distributed to antenna elements in a different manner with respect to the present embodiments. FIG. 8 shows a MIMO configuration having two transmit antenna elements 800, 802 and two receive antenna elements 804, 806. There are two delay taps 808, 810 representing different paths in delay elements 814 to 820 of an emulator 812. Signals from each transmit antenna 800, 802 are fed to delay elements 814 to 820 delaying the signals with the same delays (taps 808, 810). The outputs of delay elements 814 and 820 which delay with both delays (taps 808, 810) are combined and fed to the antenna element 806. Correspondingly, the outputs of delay elements 816 and 818 which also delay with both delays (delay taps 808, 810) are combined and fed to the antenna element 804.

Figure 9:
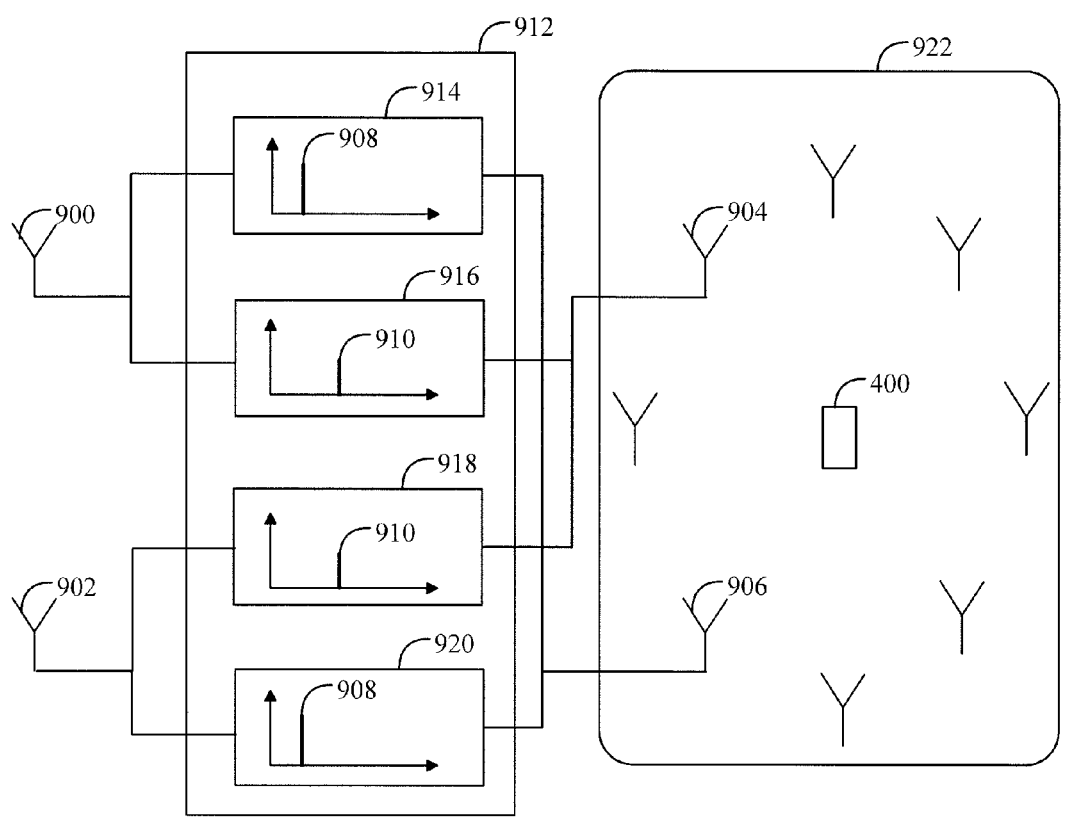
FIG. 9 presents controlling delays of antennas in an OTA chamber.

FIG. 9 shows an example of a present embodiment. Also in this example there are two transmit antenna elements 900, 902 and two receive antenna elements 904, 906 of a plurality of antenna elements in an anechoic chamber 922 of the OTA test. There are two delay taps 908, 910 representing different paths in delay elements 914 to 920 of an emulator 912. A signal from a transmit antenna 900 is fed to delay elements 914, 916. The delay element 914 delays the signal with a delay corresponding to the delay tap 908 and the delay element 916 delays the signal with a delay corresponding to the delay tap 910.

A signal from a transmit antenna 902 is fed to delay elements 918, 920. The delay element 918 delays the signal with a delay corresponding to the delay tap 910 and the delay element 920 delays the signal with a delay corresponding to the delay tap 908. The outputs of delay elements 914 and 920 which delay with the same delay (delay tap 908) are combined and fed to the antenna element 906. Correspondingly, the outputs of delay elements 916 and 918 which delay with the same delay (delay tap 910) are combined and fed to the antenna element 904. Hence, different delay taps are fed to different antenna elements 904, 906 if they represent a different AoA.

Creation of spatial effects inside an OTA chamber reminds the sum-of-sinusoids based channel modelling. A technique for parameter calculation for spatio-temporal channel models, called $L^p$-norm method, can be refined for OTA channel modelling. For an accurate spatial correlation modelling, a cost function such as an $L^2$-norm $E_\rho(g_1, g_2, \ldots, g_K)$ may be optimized $$E_\rho(g_1, g_2, \ldots, g_K) = \sqrt{\frac{1}{M} \sum_{m=1}^{M} |\rho(\Delta_m, \varphi_0 \sigma_\varphi) - \tilde{\rho}(\Delta_m)|^2}, \quad (8)$$

where $\rho(\Delta_m, \phi_0 \sigma_\phi)$ is a theoretical spatial cross correlation on a separation $\Delta_m$ of antenna elements, $\phi_0$, is a nominal AoA, $\sigma_\phi$ is an angular spread, and $\tilde{\rho}(\Delta_m)$ is a spatial correlation obtained with the OTA antenna elements. The purpose is to determine weights $g_k$ of OTA antenna elements by minimizing the cost function above with respect to weights of the antenna elements. Alternatively, the optimization may be performed by a gradient method, a half space method or the like.

The theoretical cross correlation function for Laplacian shaped PAS is defined as $$\rho(\Delta_m, \varphi_0 \sigma_\varphi) = \int \exp(-j2\pi\Delta_m \sin(\varphi_0 + \varphi)) \frac{1}{\sqrt{2}\,\sigma_\varphi} \exp\left(\frac{\sqrt{2}\,|\varphi|}{\sigma_\varphi}\right) d\varphi \quad (9)$$

In practice, it can be calculated for truncated Laplacian PAS or by discrete approximation. The spatial correlation obtained with the OTA antenna elements may be defined as $$\tilde{\rho}(\Delta_m, \theta_0) = \left(\sum_{k=1}^{K'} g_k\right)^{-1} \sum_{k=1}^{K'} g_k \exp(-j2\pi\Delta_m \sin\theta_k) \quad (10)$$

With a solution of eight OTA elements of spatial antenna it may be chosen $K'=3$, $\theta_k \in \{0°, 45°, 90°, 135°, 180°, 225°, 270°, 315°, 360°\}$ and $g_k$ may be limited such that $g_k \subset [0,1]$. A practical value for $\Delta_m$ is 0.6 and M about 50. The optimization can be performed numerically by applying a binary search in K' dimensional space, because eq. (8) is a convex function. With a binary search only about $\log_2 L^{K'} = K' \log_2 L$ iterations (i.e. computations of eq. (8)) are needed, where L is the number of points of $g_k \subset [0,1]$. If e.g. L=1000 and K'=3, only 30 iterations are needed. With these parameters a brute force method would require $1000^3 = 10^9$ solutions for eq. (8).

The eq. (8) can be computed by applying (9) and (10) and using numerical optimization methods, such as a gradient method and a half space method. Here the equation is opened to more analytical form. In order to simplify the notation let us denote the weights as a vector $$G = (g_1, g_2, \ldots, g_K), \quad (11)$$

and the set of the phase terms as vectors $$A_m = (a_{m1}, a_{m2}, \ldots, a_{mK'}) \quad (12)$$
$$= (\exp(-j2\pi\Delta_m \sin\theta_1), \exp(-j2\pi\Delta_m \sin\theta_2), \ldots,$$
$$\exp(-j2\pi\Delta_m \sin\theta_{K'}))$$

and the theoretical cross correlation as a scalar $$\rho_m = \rho(\Delta_m, \phi_0, \sigma_\phi) \quad (13)$$

Now $E_\rho$ may be minimized by solving zero of the gradient $$\nabla E_\rho(g_1, g_2, \ldots, g_K) = \sum_{k=1}^{K'} 2u_k \sum_{m=1}^{M} \left|\rho_m - \frac{G \cdot A}{\sum_{k=1}^{K'} g_k}\right| \quad (14)$$

$$\left(\frac{a_{mk} \sum_{k=1}^{K'} g_k - (G \cdot A)K'}{\sum_{k=1}^{K'} g_k}\right)$$

$$= 0$$

where $u_k$ is the kth unit base vector. The gradient equation above can be processed to a set of K' equations, which may be solved with respect to weights $g_k$ $$\begin{cases} \sum_{m=1}^{M} \left|\rho_m - \frac{G \cdot A}{\sum_{k=1}^{K'} g_k}\right| \left(\frac{a_{m1} \sum_{k=1}^{K'} g_k - (G \cdot A)K'}{\sum_{k=1}^{K'} g_k}\right) = 0 \\ \vdots \\ \sum_{m=1}^{M} \left|\rho_m - \frac{G \cdot A}{\sum_{k=1}^{K'} g_k}\right| \left(\frac{a_{mK'} \sum_{k=1}^{K'} g_k - (G \cdot A)K'}{\sum_{k=1}^{K'} g_k}\right) = 0 \end{cases} \quad (15)$$

Equation (15) represent an analytical set of equations, i.e. making the gradient (14) as zero.

For accurate correlation modelling the nominal arrival angle $\phi_0$ in eq. (10) and (11) may be rounded to the closest OTA antenna element direction $\theta_{k_i}$. Then K' OTA antenna elements (an odd number of antennas) may be selected symmetrically around antenna K. As a rule of thumb, the number K' should be less than 180°. If e.g. K'=3 and $\Delta\theta=45°$, antenna element angles $\theta_{k_i}=-45°$, $\theta_{k_j}=0°$ and $\theta_{k_i}=45°$ may be set for eq. (10). Now coefficients $\{g_{k_i}-1, g_{k_j}, g_{k_i}+1\}$ may be determined by minimizing formula (8). Other coefficients $g_k$ are equal to zero. Finally, weight $w_{n,k}$ for a cluster n and an antenna element k may be written as $$w_{n,k} = \sqrt{g_k}, \quad (16)$$

where coefficients gk are determined separately for each cluster n.

Figure 12:
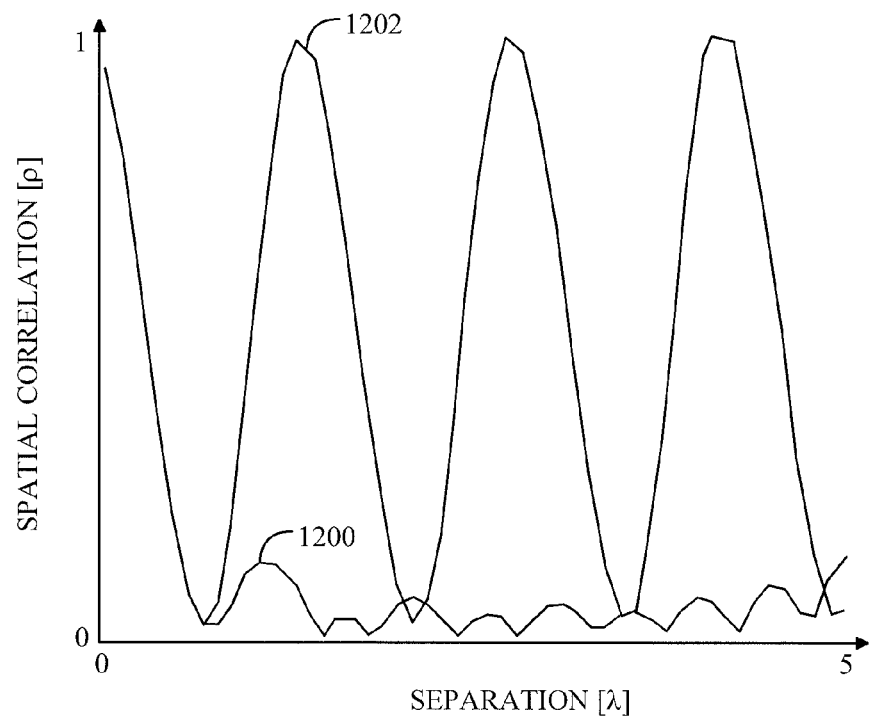
FIG. 12 presents spatial correlation of three antenna elements.

FIG. 12 presents an example of a theoretical spatial correlation 1200 of three antenna elements and an ideal spatial correlation 1202 of 35° Laplacian PAS, 8 OTA antenna elements with 45° spacing.

In an OTA chamber, the positions of antenna elements are fixed. When modelling arbitrary arrival angles (AoA), the directions between OTA antennas need to be interpolated. This can be done by minimizing the norm of eq. (6) by using the actual nominal arrival angles $\phi_0$ without any rounding. Otherwise the procedure is as described above.

Figure 13:
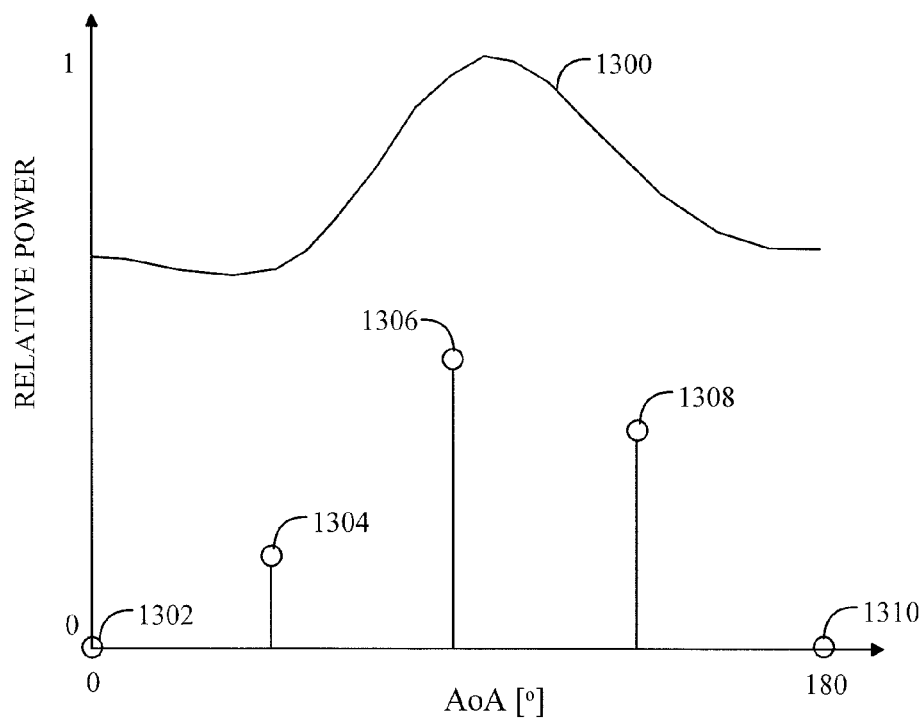
FIG. 13 presents weights of antenna elements and resulting PAS.
Figure 14:
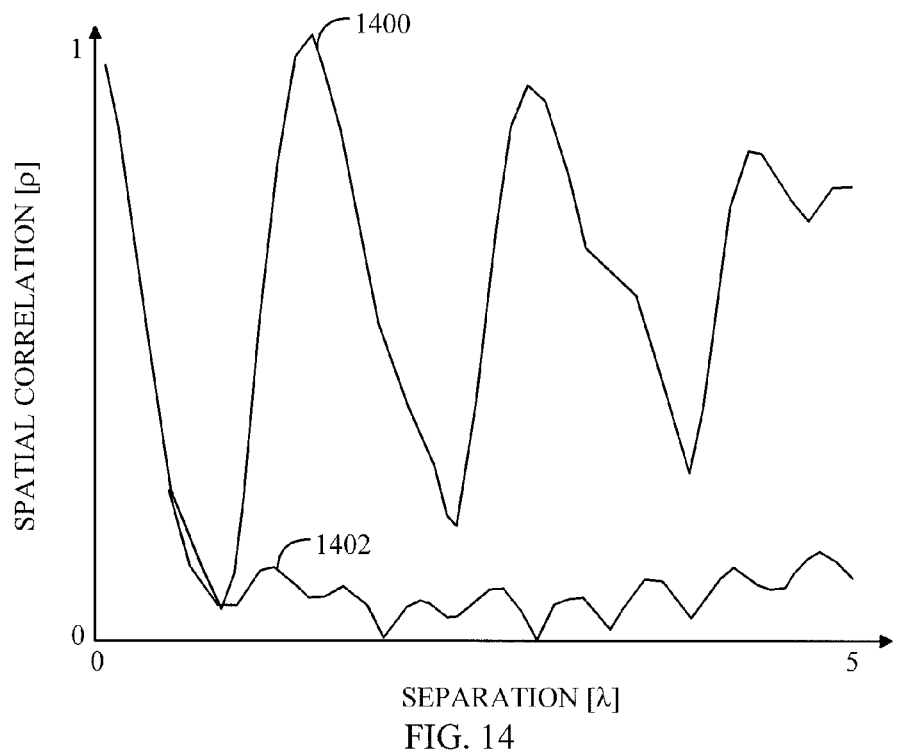
FIG. 14 presents a theoretical correlation and ideal spatial correlation.

In the example of FIGS. 13 and 14, weights of antenna elements were determined by a joint optimization. FIG. 13 presents weights 1302, 1304, 1306, 1308 and 1310 of antenna elements and resulting PAS 1300. FIG. 14 presents a theoretical spatial correlation 1400 of three antenna elements and ideal spatial correlation 1402. The example refers to a two-element ULA on Rx, 8 OTA antennas with 45° spacing, AoA=100°. The target AoA was 100° and the target cross correlation on 0.5 wavelength separation $|\rho|=0.2476$. A resulting correlation matrix Rrx_abs is given below and the resulting maximum on PAS in FIG. 4 a) is 101°.

$$Rrx\_abs = \begin{bmatrix} 1.0000 & 0.2404 \\ 0.2404 & 1.0000 \end{bmatrix}$$

Figure 15:
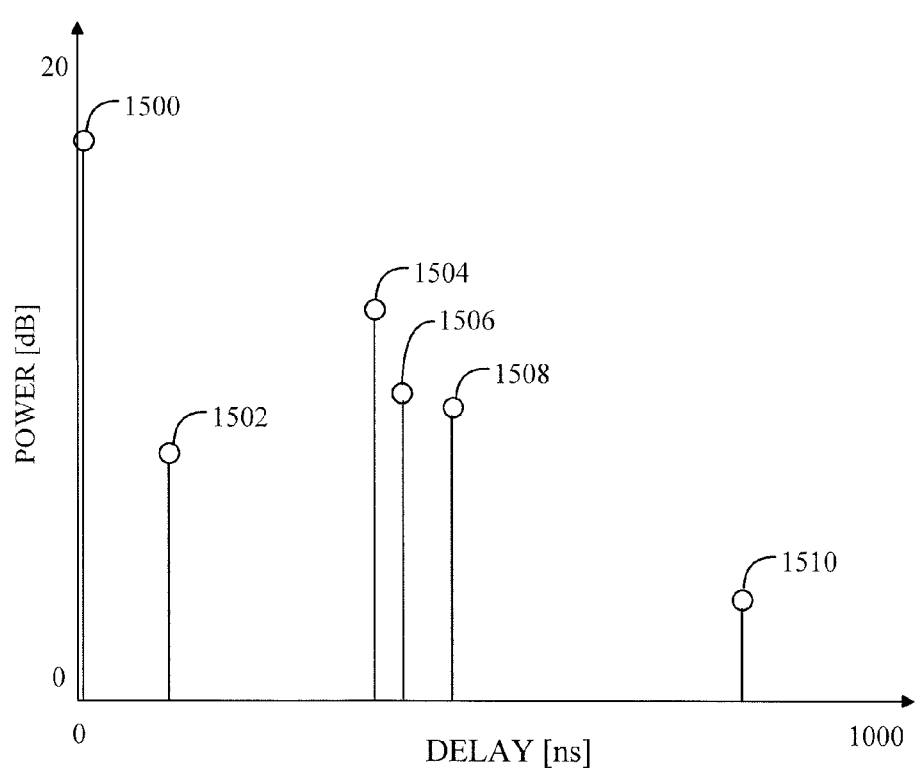
FIG. 15 presents a PDP of six clusters.
Figure 16:
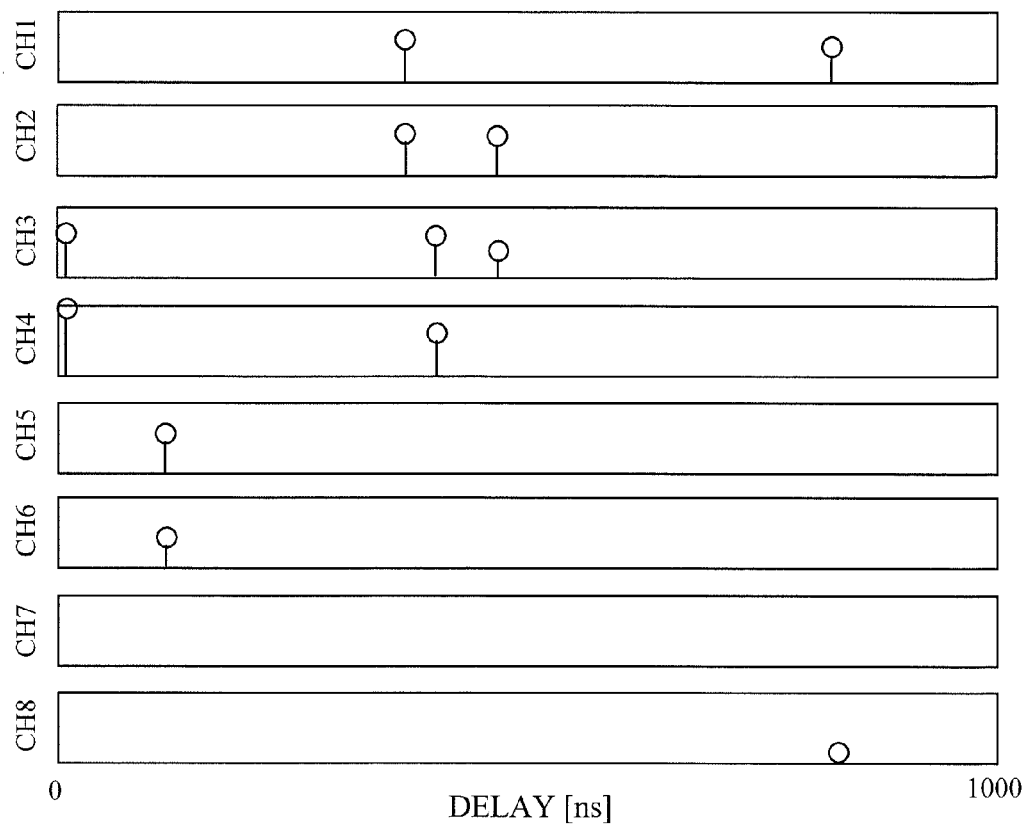
FIG. 16 presents a delay tap mapping of eight channels.

In the radio channel emulation, the channel impulse responses are fed to the emulator and convolved with the transmitted signal. In the conventional emulation, the impulse responses of different MIMO channels (Tx/Rx antenna pairs) have equal power delay profiles and number of taps. The modelling for the OTA environment is different. The channel impulse responses may be disassembled and reassembled for different OTA antenna elements based on AoA information of clusters (taps). The original PDP (Power Delay Profile) of six clusters 1500, 1502, 1504, 1506, 1508 and 1510 of an example realisation of SCM model is illustrated in FIG. 15. The delay tap mapping of eight channels in the OTA emulation case is depicted in FIG. 16. There are six clusters each having a different delay.

In addition to mapping of taps to OTA antennas with power weighting the original fading signal needs also to be modified by a Doppler shifting. This is necessary to obtain the desired correlation and AoA effects. In each geometric channel model, a moving mobile terminal may be assumed. Terminal motion is described by a velocity vector with specific direction of travel angle $\theta_v$.

If the plane wave has direction $\theta_k$ of an antenna element k instead of direction $\phi_n$, eq. (2) may be written as:

$$v_k = \frac{\|\bar{v}\|\cos(\theta_k - \theta_v)}{\lambda_0}. \tag{17}$$

Now, a Doppler correction term results for an OTA antenna element k and a cluster n as $$C_{k,n} = \tau_k - v_n. \tag{18}$$

Finally, in addition to the power weighting the Doppler spectrum of cluster n transmitted by an OTA antenna element k may be shifted by frequency shifting $$H_{s,n,k}^{OTA}(t,\tau) = w_{n,k}H_{s,n}(t,\tau)\exp(j2\pi C_{k,n}t), \tag{19}$$

where $H_{s,n}(t,\tau)$ is a channel coefficient from eq. (1).

Figure 17:
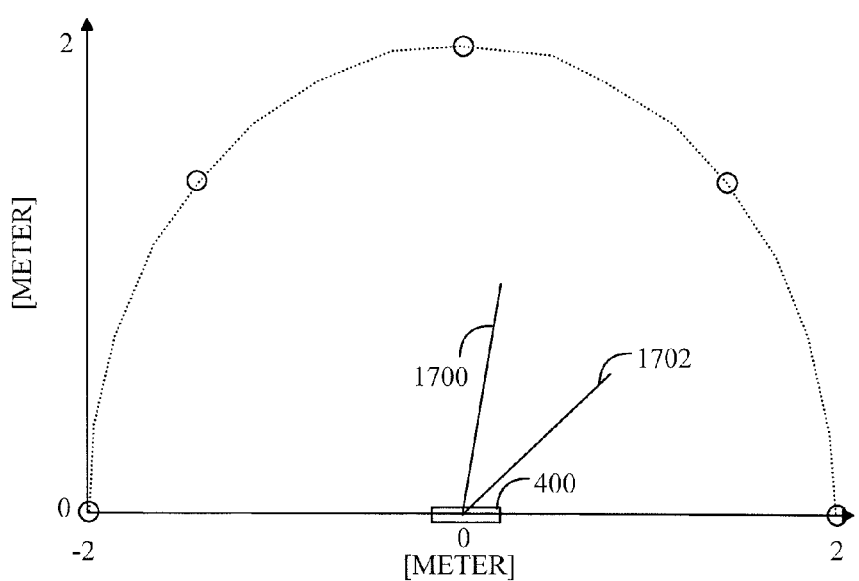
FIG. 17 presents a situation where a DUT spatial resolution is narrower than a spacing of the antenna elements.

Accuracy of the OTA channel modelling may also be taken into account. FIG. 17 presents a situation where a DUT spatial resolution is 24°, a number of OTA antenna elements is 8, a spacing of the antenna elements is 45°. The OTA antenna elements are marked with circles. A reference number 1700 refers to AoA vector and a reference number 1702 refers to a velocity vector.

Figure 18:
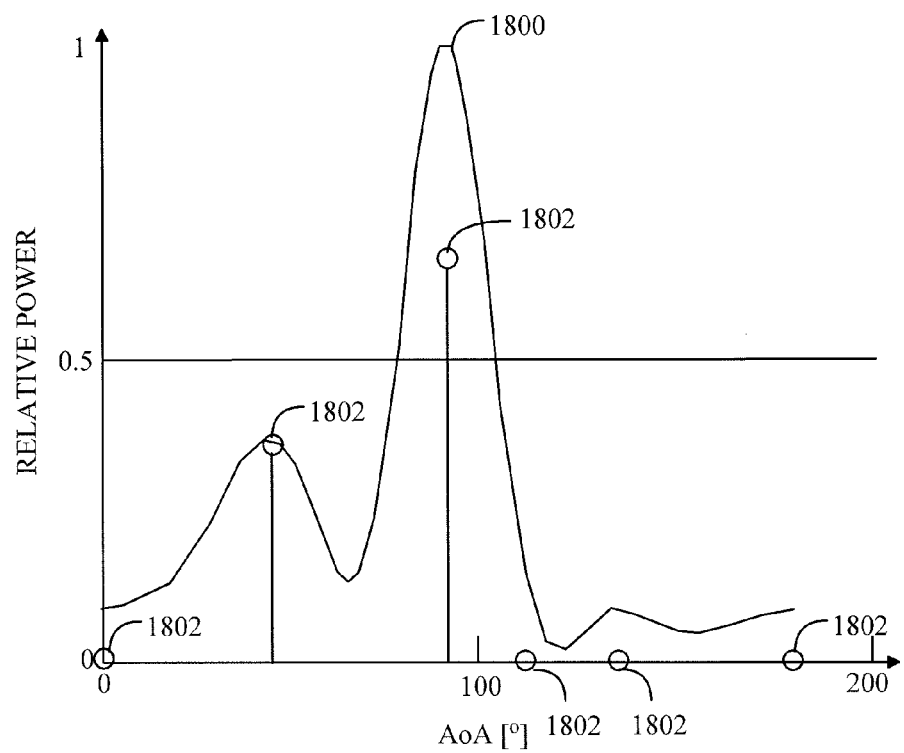
FIG. 18 presents a PAS in the situation of FIG. 17.

FIG. 18 presents a PAS 1800 seen by the receiver in the situation described in FIG. 17. Circles 1802 depict a relative power of the antenna elements. The PAS 1800 has two peaks and that is not desirable.

Figure 19:
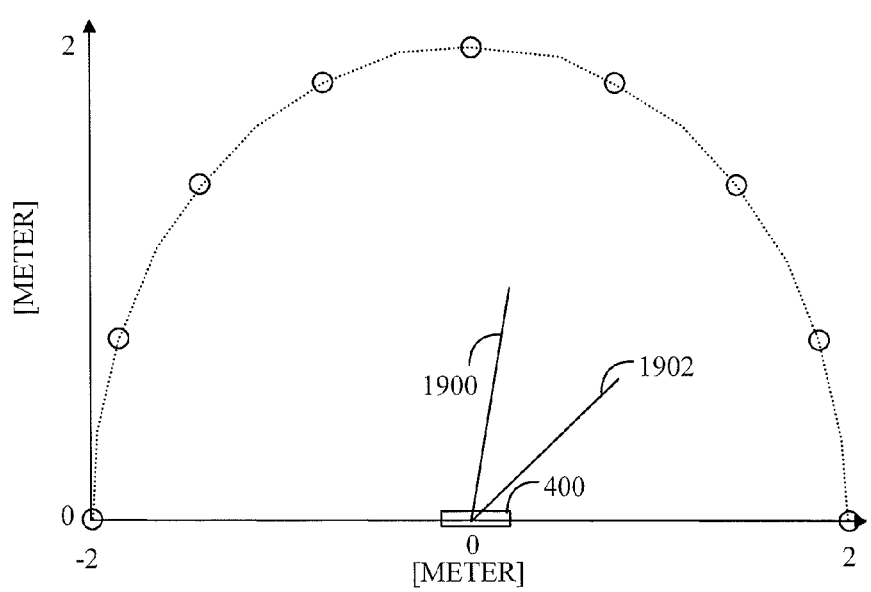
FIG. 19 presents a situation where a DUT spatial resolution is wider than a spacing of the antenna elements.

FIG. 19 presents a situation where a DUT spatial resolution is 24°, the number of OTA antenna elements is 16, spacing of the antenna elements is 22.5°. The OTA antenna elements are marked with circles. A reference number 1900 refers to AoA vector and a reference number 1902 refers to a velocity vector.

Figure 20:
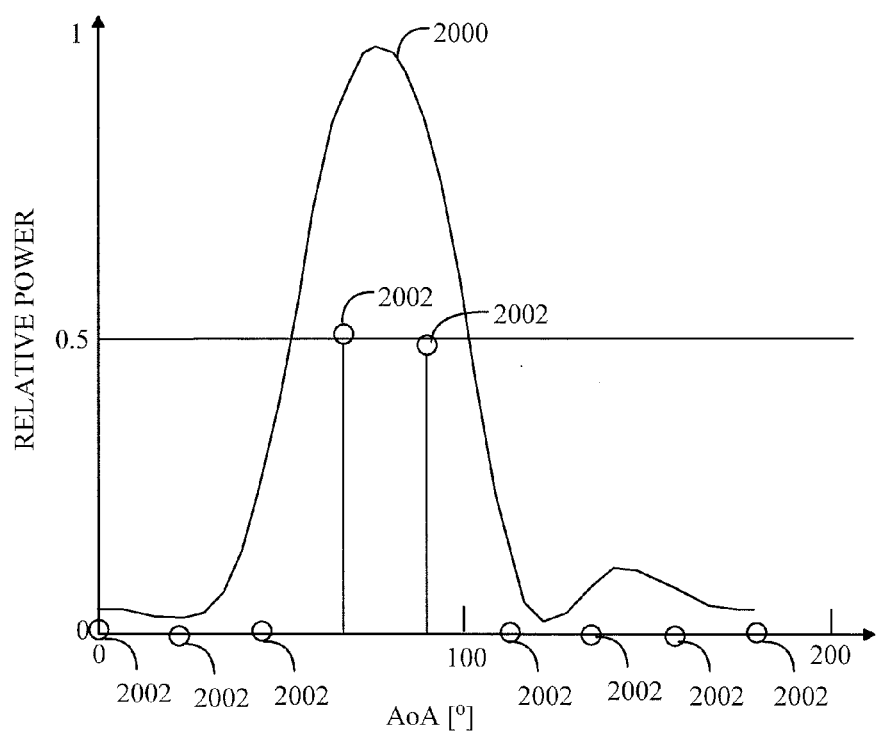
FIG. 20 presents a PAS in the situation of FIG. 19.

FIG. 20 presents a PAS 2000 seen by the receiver in the situation described in FIG. 19. Circles 2002 depict a relative power of the antenna elements. The PAS 2000 has only one peak and that is desirable. The DUT antenna array size determines the spatial resolution. A rule of thumb resolution for l/2 ULA is 96°/#DUT antennas. For example, a two-antenna ULA results in 48° AoA and a 4-antenna ULA results in 24° AoA. Hence, a spacing between OTA antenna elements is desirably smaller than a spatial resolution of the DUT.

When Laplacian shaped PAS and 35° rms azimuth spread, it is possible to control one-wavelength-sized arrays with eight antenna elements of an OTA chamber and two-wavelength-sized arrays with sixteen antenna elements of an OTA chamber.

The number of OTA antennas used for a cluster PAS modelling determines on how large DUT array size can have accurate correlations. The size of a DUT should be small but the more antenna elements in OTA, the larger dimensions the DUT can have.

Figure 21:
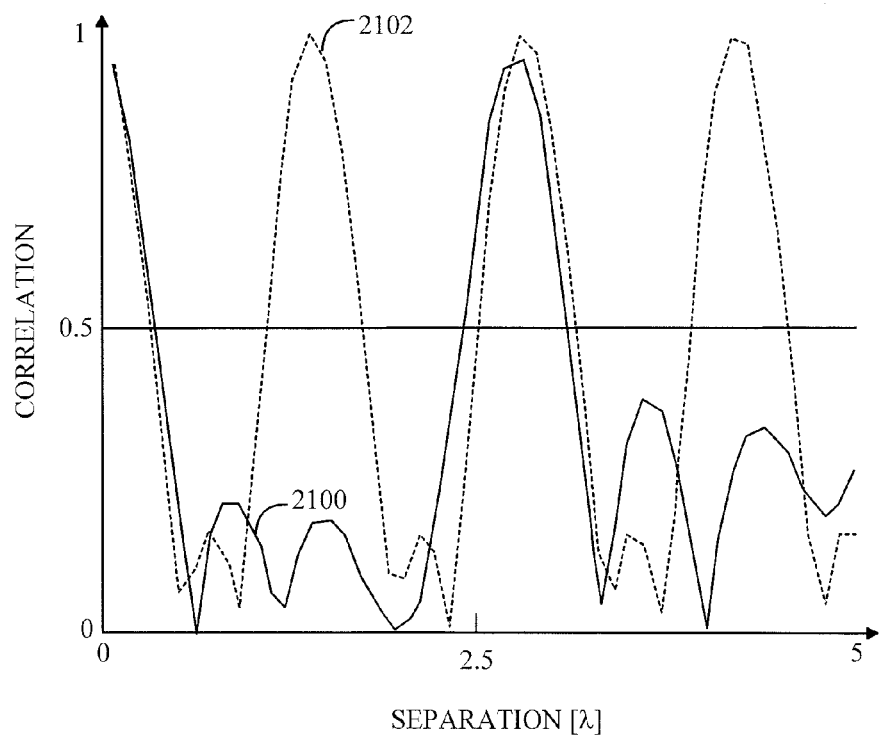
FIG. 21 presents a PAS of three and five antenna elements.

FIG. 21 presents a PAS 2100 with five transmission antenna elements and a PAS 2102 with three transmission antenna elements.

The fading, including Doppler and possible correlation of antenna elements of OTA as well as a channel power delay profile, may be included in the channel coefficients.

Channel coefficients may be generated by a modified version of eq. (18)

$$H_{s,n}(t,\tau) = \sqrt{P_n} \sum_{m=1}^{M} \begin{pmatrix} F_{tx,s}(\phi_{n,m})\exp(jd_s k\sin(\phi_{n,m})). \\ \exp(j(\Phi + 2\pi v_{n,m}t))\delta(\tau - \tau_{n,m}) \end{pmatrix} \tag{20}$$

If the OTA chamber has dual-polarized antenna elements, the channel coefficient formula may be written separately for V and H polarizations:

$$H_{V,s,n}(t,\tau) = \sqrt{P_n} \tag{21}$$

$$\sum_{m=1}^{M} \left( \begin{bmatrix} F_{tx,s}^V(\phi_{n,m}) \\ F_{tx,s}^H(\phi_{n,m}) \end{bmatrix}^T \begin{bmatrix} \exp(j\Phi_{n,m}^{vv}) & \sqrt{\kappa_{n,m}^{-1}}\exp(j\Phi_{n,m}^{vh}) \\ \sqrt{\kappa_{n,m}^{-1}}\exp(j\Phi_{n,m}^{hv}) & \exp(j\Phi_{n,m}^{hh}) \end{bmatrix} \right. $$
$$\begin{bmatrix} 1 \\ 0 \end{bmatrix}.$$
$$\left. \exp(jd_s k\sin(\phi_{n,m}))\exp(j(2\pi v_{n,m}t))\delta(\tau - \tau_{n,m}) \right)$$

$$H_{H,s,n}(t,\tau) = \sqrt{P_n} \tag{22}$$

$$\sum_{m=1}^{M} \left( \begin{bmatrix} F_{tx,s}^V(\phi_{n,m}) \\ F_{tx,s}^H(\phi_{n,m}) \end{bmatrix}^T \begin{bmatrix} \exp(j\Phi_{n,m}^{vv}) & \sqrt{\kappa_{n,m}^{-1}}\exp(j\Phi_{n,m}^{vh}) \\ \sqrt{\kappa_{n,m}^{-1}}\exp(j\Phi_{n,m}^{hv}) & \exp(j\Phi_{n,m}^{hh}) \end{bmatrix} \right. $$
$$\begin{bmatrix} 0 \\ 1 \end{bmatrix}.$$
$$\left. \exp(jd_s k\sin(\phi_{n,m}))\exp(j(2\pi v_{n,m}t))\delta(\tau - \tau_{n,m}) \right)$$

Here $F_{tx,s}^V$ and $F_{tx,s}^H$ are field patterns of V (Vertical) and H (Horizontal) polarizations of the antenna elements, respectively. Phase terms $\Phi_{n,m}^{vv}$ etc. are random initial phases $\in [0,2\pi]$ and $\kappa_{n,m}$ are cross polarization power ratios (XPR).

Note that Doppler frequencies $v_{n,m}$ are still determined on the basis of AoA angles. The result is a discrete impulse response with matrix coefficients $H_n(t, \tau)$. Dimensions of $H_n(t, \tau)$ are in single-polarized case 1×S and in dual-polarized case 2×S, where S is the number of OTA antenna elements. This step can be done by a Matlab implementation of a geometric channel model, e.g. SOME or WINNER model.

Next, mapping of the clusters n to proper emulator channels and OTA antenna elements depending on a cluster nominal direction and a cluster angle spread may be performed. The selected method may depend on whether accurate AoA (referring to eq. (5)), accurate spatial correlation (referring to eq. (16)) or balanced combination of the both (referring to FIG. 14 and its explanation) is emphasized. The methods are described for a single-polarized case, but they are applicable also in the dual polarized case. The only difference is that in a dual-polarized case V (Vertical) and H (Horizontal) polarized channel impulse responses from eq. (21) and (22) may be mapped separately to V and H polarized OTA antenna elements.

Figure 22:
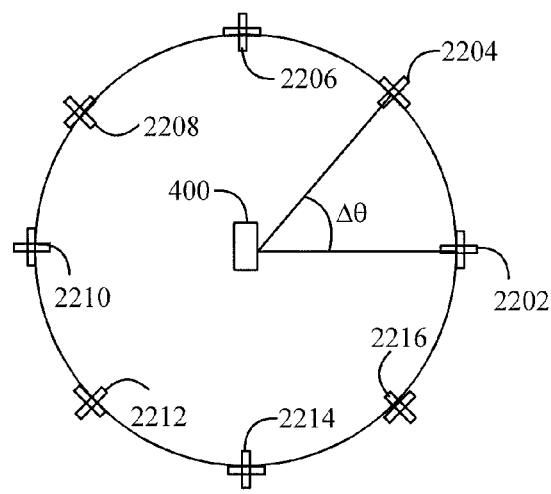
FIG. 22 presents polarizing antenna elements.

FIG. 22 presents an OTA chamber antenna setup with eight uniformly spaced dual-polarized chamber antenna elements 2202, 2204, 2206, 2208, 2210, 2212, 2214 and 2216. In FIG. 22, the V-polarized elements are actually orthogonal to the paper (azimuth plane).

Figure 23:
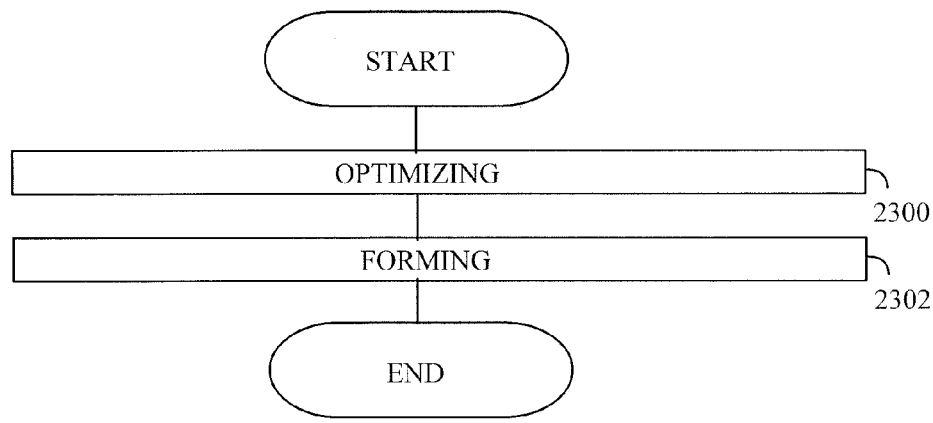
FIG. 23 shows a flow chart of a method of optimizing an $L^p$-norm.

FIG. 23 presents a flow chart of the method. In step 2300, a cost function of a theoretical spatial cross correlation and a spatial correlation obtained with antenna elements is optimized for determining weights of the antenna elements. In step 2302, on the basis of the weights, a beam of a signal of at least one path of a simulated radio channel is formed with at least two antenna elements of a plurality of the antenna elements coupled to an emulator in an anechoic chamber.

Figure 24:
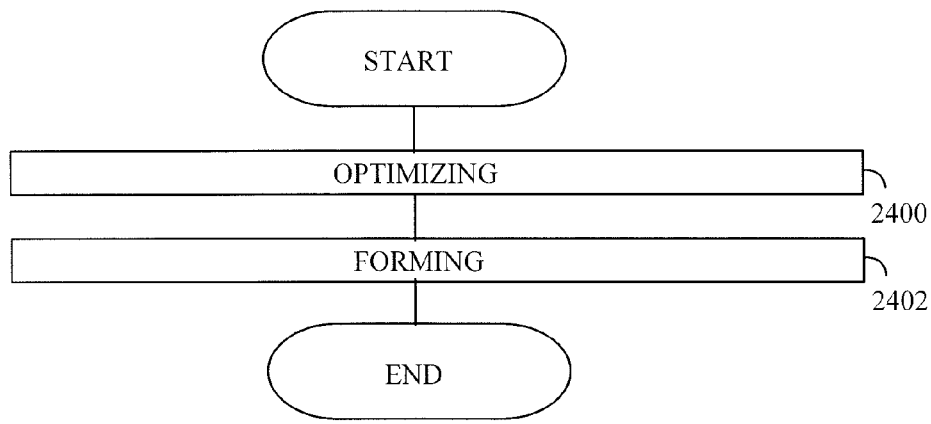
FIG. 24 shows a flow chart of a method of optimizing an $L^p$-norm with polarizing antenna elements.

FIG. 24 presents a flow chart of the method. In step 2400, a cost function of a theoretical spatial cross correlation and a spatial correlation obtained with antenna elements is optimized for determining weights of the antenna elements. In step 2402, on the basis of the weights, a beam of a signal of at least one path of a simulated radio channel with at least two antenna elements of a plurality of the antenna elements coupled to an emulator in an anechoic chamber, the at least two antenna elements polarizing the beam in a known manner.

The embodiments may be implemented, for instance, with ASIC or VLSI circuits (Application Specific Integrated Circuit, Very Large Scale Integration). Alternatively or additionally, the embodiments of method steps may be implemented as a computer program comprising instructions for executing a computer process for communicating with an electronic device under test through a simulated radio channel of an emulator. The emulator may control on the basis of the electronic circuits and/or the computer program, the use of the antenna elements and the formation of beams in the anechoic chamber.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A method of communicating with an electronic device under test through a simulated radio channel of an emulator, the method comprising:
   optimizing a cost function of a theoretical spatial cross correlation and a spatial correlation associated with a plurality of antenna elements coupled to an emulator in an anechoic chamber to determine weights of the plurality of antenna elements; and
   forming, based on the weights, a beam of a signal of at least one path of a simulated radio channel with at least two antenna elements of the plurality of antenna elements, wherein a direction of each path depends on a direction of each antenna element.

2. A method of communicating with an electronic device under test through a simulated radio channel of an emulator, the method comprising:
   optimizing a cost function of a theoretical spatial cross correlation and a spatial correlation associated with a plurality of antenna elements coupled to an emulator in an anechoic chamber to determine optimized weights of the antenna elements; and
   forming, based on optimized the weights, a beam of a signal of at least one path of a simulated radio channel with at least two antenna elements of the plurality of antenna elements, the at least two antenna elements being coupled to the emulator in the anechoic chamber, the at least two antenna elements polarizing the beam.

3. A testing system of communicating with an electronic device under test through a simulated radio channel of an emulator, wherein the testing system is configured to:
   optimize a cost function of a theoretical spatial cross correlation and a spatial correlation associated with a plurality of antenna elements coupled to emulator in an anechoic chamber to determine weights of the plurality of antenna elements; and
   form, based on the weights, a beam of a signal of at least one path of a simulated radio channel with at least two antenna elements of the plurality of the antenna elements.

4. A testing system of communicating with an electronic device under test through a simulated radio channel of an emulator, wherein the testing system is configured to: optimize a cost function of a theoretical spatial cross correlation and a spatial correlation associated with a plurality of antenna elements coupled to an emulator in an anechoic chamber to determine optimized weights of the plurality of antenna elements; and form, based on the optimized weights, a beam of a signal of at least one path of a simulated radio channel with at least two antenna elements of the plurality of the antenna elements, the at least two antenna elements being coupled to the emulator in an anechoic chamber, die at least two antenna elements being configured to polarize the beam.

* * * * *

UNITED STATES PATENT AND TRADEMARK OFFICE
CERTIFICATE OF CORRECTION

PATENT NO. : 9,786,999 B2  
APPLICATION NO. : 13/121691  
DATED : October 10, 2017  
INVENTOR(S) : Pekka Kyosti et al.

Page 1 of 1

It is certified that error appears in the above-identified patent and that said Letters Patent is hereby corrected as shown below:

In the Specification

In Column 1, Line 7, Delete "PCT/FI2008/050155" and insert -- PCT/FI2009/050155 --, therefor.

In the Claims

In Column 16, Line 51, in Claim 4, delete "die" and insert -- the --, therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*